United States Patent
Hudson

(10) Patent No.: US 10,160,331 B2
(45) Date of Patent: Dec. 25, 2018

(54) ELECTRICAL POWER SYSTEM FOR VEHICLES REQUIRING ELECTRICAL POWER WHILE THE VEHICLE IS NOT RUNNING

(71) Applicant: B.P.U. Innovations, LLC, Iowa City, IA (US)

(72) Inventor: Bruce Hudson, Iowa City, IA (US)

(73) Assignee: Bruce Hudson, Iowa City, IA (US)

( * ) Notice: Subject to any disclaimer, the term of this patent is extended or adjusted under 35 U.S.C. 154(b) by 277 days.

(21) Appl. No.: 14/925,257

(22) Filed: Oct. 28, 2015

(65) Prior Publication Data

US 2016/0114685 A1 Apr. 28, 2016

Related U.S. Application Data

(60) Provisional application No. 62/069,732, filed on Oct. 28, 2014, provisional application No. 62/141,591, filed on Apr. 1, 2015.

(51) Int. Cl.
| | |
|---|---|
| *B60L 1/00* | (2006.01) |
| *B60L 11/02* | (2006.01) |
| *B60L 11/18* | (2006.01) |

(52) U.S. Cl.
CPC .............. *B60L 11/02* (2013.01); *B60L 1/00* (2013.01); *B60L 11/1861* (2013.01); *B60L 11/1862* (2013.01); *B60L 2200/40* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 90/16* (2013.01)

(58) Field of Classification Search
CPC ....... B60L 11/02; Y02T 10/7077; Y02T 90/16
See application file for complete search history.

(56) References Cited

U.S. PATENT DOCUMENTS

| | | | |
|---|---|---|---|
| 6,621,050 B2* | 9/2003 | Plantz | B23K 9/1006 219/133 |
| 7,145,788 B2 | 12/2006 | Plummer | |
| 7,259,469 B2 | 8/2007 | Brummett | |
| 2006/0023480 A1* | 2/2006 | Plummer | B60H 1/00278 363/146 |
| 2010/0212932 A1* | 8/2010 | Glore | H01B 5/08 174/113 C |
| 2016/0243960 A1* | 8/2016 | Wood | H02J 7/345 |

FOREIGN PATENT DOCUMENTS

AU 2005237124 * 6/2006

* cited by examiner

*Primary Examiner* — Jared Fureman
*Assistant Examiner* — Duc M Pham
(74) *Attorney, Agent, or Firm* — Nyemaster Goode, PC

(57) ABSTRACT

A system for powering a hotel load in a vehicle which has a power supply with a positive pole and a negative pole, an alternator connected to the engine and in direct connection with the power supply, a starter connected to the engine and in direct electrical communication with the power supply. The vehicle also has a power inverter in electrical communication with the power supply through a pair of power inverter cables. The alternator, the starter, and the power inverter are connected in parallel and directly to the power supply.

23 Claims, 3 Drawing Sheets

ELECTRICAL POWER SYSTEM FOR VEHICLES REQUIRING ELECTRICAL POWER WHILE THE VEHICLE IS NOT RUNNING

CROSS-REFERENCE TO RELATED APPLICATION(S)

This application claims priority to and the benefit of U.S. Provisional Application No. 62/069,732, filed Oct. 28, 2014, entitled "ELECTRICAL POWER SYSTEM FOR VEHICLES REQUIRING ELECTRICAL POWER WHILE THE VEHICLE ENGINE IS NOT RUNNING," and U.S. Provisional Application No. 62/141,591, filed Apr. 1, 2015, entitled "ELECTRICAL POWER SYSTEM FOR VEHICLES REQUIRING ELECTRICAL POWER WHILE THE VEHICLE ENGINE IS NOT RUNNING," the entire contents of which are hereby incorporated by reference.

BACKGROUND OF THE DISCLOSURE

Various vehicles, including long haul semi trucks, short haul semi trucks, L.T.L. trucks, boats, recreational vehicles, police vehicles, fire trucks, ambulance vehicles, various aircraft such as airplanes and helicopters and utility vehicles are equipped with electronic equipment. The electronic equipment requires power when the engine is running as well as when the engine shut off. The electronic equipment may include any combination or all of lighting, heating, cooling, refrigerator, microwave, toaster, coffee maker, TV., gaming system, and laptop computers. The use of electricity in a vehicle to power this electronic equipment is referred to as a "hotel load". Regulations on idling engines, fuel consumption costs, emission of pollutants, engine wear, make it undesirable to run the engine to supply power for the hotel loads. Due to increased regulations over the years, many attempts have been proposed to supply power to the hotel loads while the vehicle engine is shut off.

At this present time, there are a couple different ways proposed to deal with powering the hotel loads while the vehicle engine is shut off. These current solutions include:
  (1) Auxiliary power units (APU) powered by gasoline or diesel fuel;
  (2) Vehicle's batteries—either the existing batteries or via extra batteries installed on the vehicles which are dedicated to powering the hotel loads;
  (3) Electrically connecting the vehicle to an external AC power outlet (known as ("shore power").

Certain disadvantages and draw backs remain with respect to these arrangements currently available with APUs, extra batteries bank, and the shore power based electrical power systems.

The type of APU most commonly used is an engine-driven APU generator that utilizes diesel or other fuel such as gasoline or liquid petroleum. Such APUs provide an immediate source of electrical power, however, the electrical power the APU generates typically limited due to the small engine size used to power the APU. Thus, the sizing of the APU alternator is limited due to the horse power of the APU engine. The APUs typically used today are not designed to put out enough power to run all of the hotel loads, and charge the batteries to a sufficient state of charge when the vehicle is shut off. APUs are noisy and expel pollutants into the atmosphere. Some states have passed laws that the APUs must have a D.P.F. ("Diesel Particulate Filter") added to the exhaust system of the APU to operate. Further conventional APUs are relatively heavy, have a relatively high initial cost and can be expensive to maintain.

Shore powered systems are superior to the use of an APU from the stand point of initial cost, weight, maintenance considerations and noise. However, a conventional power outlet may not be available where the vehicle operator either needs to, or is required to stop.

The use of the vehicle batteries to supply hotel loads, primarily consist of wiring to interconnect DC powered hotel loads to the vehicle batteries and an inverter unit for transforming DC current drawn from the batteries, to AC current for the AC powered hotel loads. These systems also are superior to the use of an APU from the standpoint of initial cost, weight, maintenance considerations, and noise. However, existing systems powered solely by the vehicle batteries are not capable of supplying the needed amount of current for the vehicle hotel loads for a sufficient or desired period of time without discharging the vehicle batteries to a point at which the vehicle cannot be started. Furthermore, the vehicle charging systems today, when the vehicle engine is running, are not adequate to continually charge the batteries to a high of 95%-100% state of charge. This is because current designs use lighter AWG (American wire gage, also known as Brown & Sharp wire gage) and tend to minimize the length of the wires to keep overall weight to a minimum for fuel consumption purposes. Wire length is minimized by using various techniques such as using the vehicle's frame as a ground such that a wire needs only to run from a component such as an alternator to the nearest open spot on the frame, or connecting different components like the alternator and the starter in series, such that the wires from each component need not extend from the battery all the way to each component.

For this reason, most of these types of over the road trucks have what is referred to as "low voltage disconnect," or LVD switches. The purpose of these switches is to monitor the voltage of the vehicle batteries so that when the voltage of the vehicle batteries get below the set voltage on the switch, typically around 12.3V, the LVD switch will disconnect the power from the hotel loads. This ensures the batteries have enough charge left in them to start the engine. Design constraints applicable to power systems for hotel loads are in part dictated today, by the vehicle in which the systems are employed. One very demanding situation is the design and implementation of such power systems for long haul trucks equipped with sleepers. The way long haul class 8 trucks equipped with sleepers are designed today, are not a reliable charging and hotel load design for these types of trucks that have a need to stop running but continue to provide power to the hotel loads for an extended period of time, on the order of 8-10 hours.

Powering the hotel loads with the engine idling, or periodically starting the truck to charge the vehicle batteries during stops of any duration often is not a viable option as the trucks are designed today with idle times for the vehicle batteries to charge a minimum of 2 hours or more multiple times during an extended stop. Specifically, a growing number of state and regional authorities are enacting "no idle" rules and regulations that limit how often the engine may be idled during a stop and the duration over which the engine can be idled. On the other hand, Federal legislation mandates ten continuous hours rest during a 24-hour period for commercial truck drivers.

No-idle regulations also complicate existing harsh design and operational constraints that apply to hotel load power systems for long haul trucks. For example, a system for providing hotel power in long haul trucks should be capable of operating reliably over a wide range of ambient temperatures (outside air temperature), such as 115° F. or more, to −20° F. or less. Reliable operation at sub-zero ambient temperatures can be difficult to achieve because the power capacity of the vehicle batteries is greatly reduced at low ambient temperatures. Until now, there has not been a system that can charge the vehicle batteries fast enough during the low ambient temperatures effectively. Regardless of ambient temperature, long haul trucks require hotel load power for required driver rest periods of ten hours or more while still being able to have adequate power to start the vehicle engine. In addition, it is desirable that the power system be capable of supplying hotel loads for a period of time that would exceed the rest period of 10 hours, should the truck be unable to resume a trip due to extreme weather conditions or other causes. This further helps drivers of long-haul trucks as they are able to sleep for longer periods of time without being interrupted by the truck starting and restarting throughout the night.

Although weight and maintenance considerations can be important with respect to other vehicles, they are of special significance with respect to power systems for long-haul trucks. Reduced weight means reduced fuel cost and less pollution, and in some cases, can mean increased load capacity. Added savings includes reduced maintenance cost, and shorter time to return on investment.

Although progress has been made, the prior progress has not fulfilled the need to have a battery-powered low maintenance, low cost, weight, efficient power system that provides reliable operation over a wide temperature range while simultaneously ensuring that electrical power is available for engine starting at low ambient temperatures and after extended periods of operation.

SUMMARY OF THE PRESENT DISCLOSURE

One aspect of the present disclosure includes a system for powering a hotel load in a vehicle, which has a power supply comprising a positive pole and a negative pole; an alternator operably connected to the engine and in direct electrical communication with the positive pole and the negative pole through a pair of alternator cables; a starter operably connected to the engine and in direct electrical communication with the positive pole and the negative pole through a single or a set of starter cables; a power inverter in electrical communication with the positive pole and the negative pole through a pair of power inverter cables; wherein the alternator, the starter, and the power inverter are connected in parallel to the power supply.

Another aspect of the present disclosure includes a vehicle capable of providing hotel power for an extended period of time, the vehicle comprising: a vehicle frame; a vehicle engine coupled with the frame and having a running state and a stopped state; a plurality of batteries electrically connected in parallel; an alternator and a starter each operably coupled with the vehicle engine, and each directly electrically connected to the plurality of batteries via battery cables; a power inverter electrically connected to the plurality of batteries; a hotel power load in electrical communication with the power inverter; wherein the alternator is configured to provide electrical power to the plurality of batteries when the vehicle engine is in the running state, and the plurality of batteries is configured to provide electrical power to the hotel power load when the vehicle engine is in the stopped state.

Yet another aspect of the present disclosure is a method of recharging a power supply in a vehicle comprising the steps of: providing a vehicle with a frame, an engine coupled with the frame and capable of propulsion, an alternator operably coupled with the engine, an alternator and a starter operably coupled with the engine, and a power supply disposed on the frame, wherein the alternator, starter, and power supply each comprise an electrically positive pole and an electrically negative pole; connecting the positive pole of the power supply directly to the positive pole of the alternator and connecting the negative pole of the power supply directly to the negative pole of the alternator; connecting the positive pole of the power supply directly to the positive pole of the starter and connecting the negative pole of the power supply directly to the negative pole of the starter; generating electrical power in the alternator by running the engine for a time; impressing on the power supply the electrical power generated in the alternator in the generating step; and charging the power supply substantially close to a full power capacity of the power supply.

These and other aspects, objects, and features of the present disclosure will be understood and appreciated by those skilled in the art upon studying the following specification, claims, and appended drawings.

DETAILED DESCRIPTION OF EMBODIMENTS

For purposes of description herein, it is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used in the disclosure, "directly connected" to a component means via at least one wire with a component connector on either end of the wire, but without other components between the battery and the component.

As used in the disclosure, "engine" means a gas-powered internal combustion engine, a diesel-powered internal combustion engine, a turbine-powered engine, or any other engine used to propel vehicles known in the art.

Figure 1:
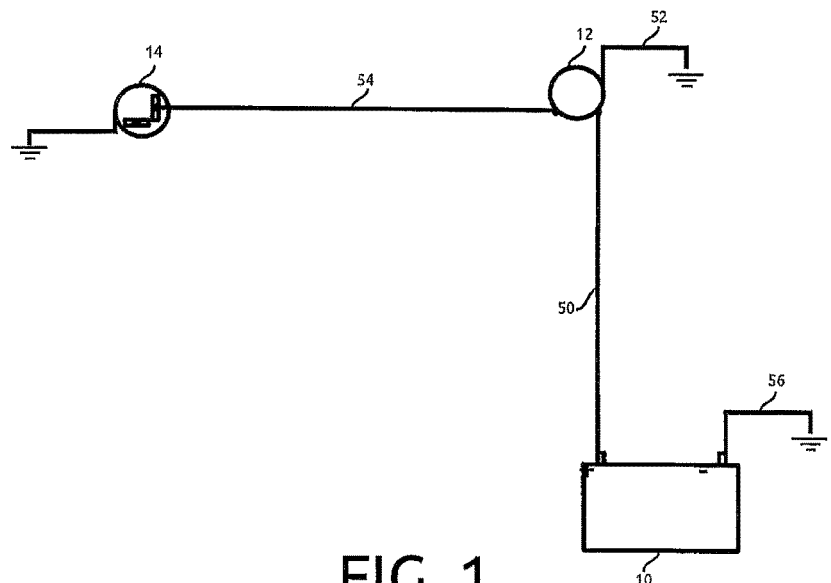
FIG. 1 is a diagram showing a current design system for electrical charging and power supply.
Figure 2:
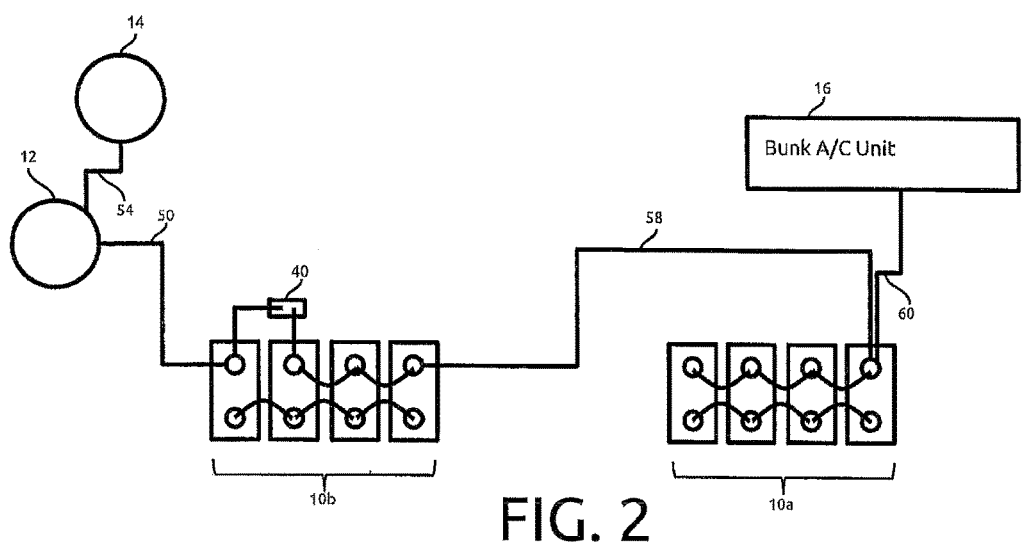
FIG. 2 is a diagram showing a current design for an 8-battery system for supplying power to a vehicle air conditioning unit.

FIGS. 1 and 2 show the current typical re-charging configuration for a long-haul truck, which has been used for 50 years or more. For simplicity, the battery 10 is shown as a single battery, but may also be an array of batteries, most typically either one or two arrays of 4 batteries 10a, 10b. The battery or batteries are typically Group 31 Heavy-Duty type batteries. The battery 10 is connected to the starter 12 via a starter wire 50. The starter 12 then has a ground wire 52 which connects to a ground, typically the frame of the vehicle (not shown). The alternator 14 is then connected in series electrically after the starter 12, again typically using 2/0 AWG wire 54. The alternator 14 typically also has a 2/0 AWG ground wire which connects to ground, typically the frame. The battery 10 is also typically connected to ground via a short 2/0 AWG wire 56 to the frame of the vehicle, which completes the circuit. Using the vehicle's frame is convenient for ease of assembly, as well as keeping the wire lengths short and keeping overall weight of the vehicle to a minimum.

The vehicle has an engine (not shown) with a running state, in which the engine is supplying power to the propulsion system of the vehicle as well as delivering mechanical rotational energy to the alternator 14, and a non-running or stopped state, in which the engine is turned off and is not supplying any power. With the vehicle's engine running, the alternator 14 is typically operably connected to the engine in a location where the output of the engine spins an internal component within the alternator 14, generating an electrical current. This current is then electrically communicated to the battery 10 via positive and ground connections, which recharges the battery 10 during the engine's running state. The charge in the battery 10 is then used to power hotel loads 18 (see FIG. 3) when the engine is in a non-running or stopped state.

The electrical resistance of the frame is unpredictable, but is always significantly higher than a direct wire connection back to the power source, the battery 10. Further, connecting the starter 12 and the alternator 14 in series as shown in FIGS. 1 and 2 increases the number of connections and voltage drops in the single circuit, also increasing unpredictability and increasing resistance in the circuit. This unpredictability may lead to "dirty voltage," or voltage that spikes and dips at random, which reduces efficiency of the recharging system and adds heat to the system, which builds in more resistance. For these reasons, this typical long-haul setup often fails to recharge the battery 10 to a substantially charged state, which is typically 95%-100% of the battery's capable charge. Further, it may take as much 2 hours to charge the battery to the maximum capable in this configuration, which is about 75% of the battery's total capability, from a substantially depleted state, which is about the LVD cutoff voltage of about 12.3V typically. Additionally, because this configuration recharges the battery 10 only to about 75%, it is necessary to run the engine and recharge the battery 10 more often in a given extended stop. A switch 40 may be placed in the front battery array 10b as shown in FIG. 2, such that when the remaining charge in the system drops below a threshold, the switch opens, preventing further depletion from that battery and ensuring enough charge to start the vehicle.

Figure 3:
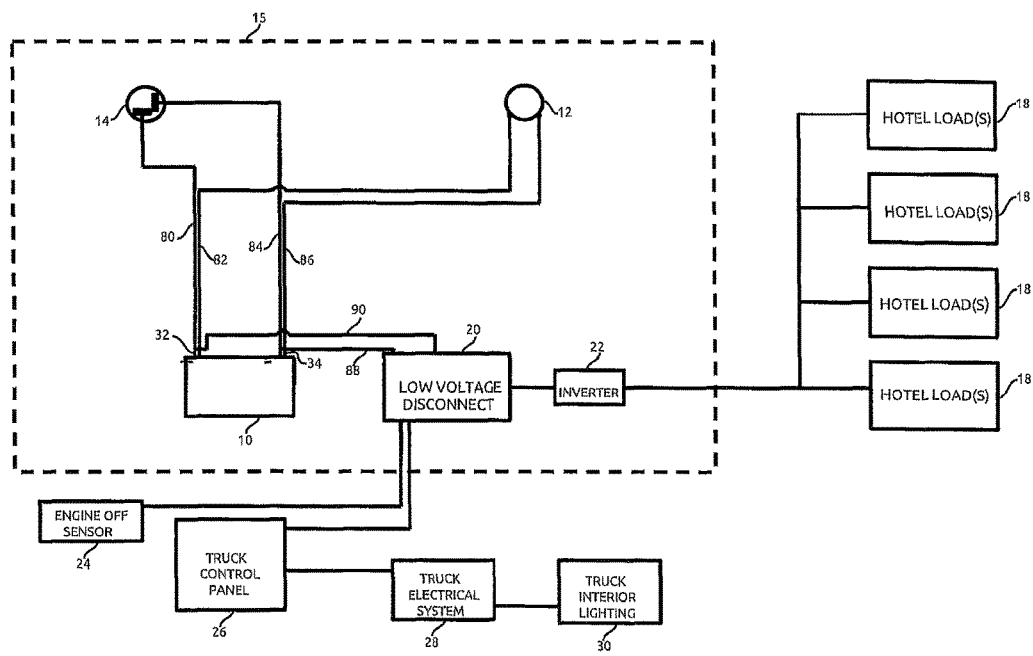
FIG. 3 is a schematic diagram showing an embodiment which includes an electrical power system in combination with various hotel loads of a long-haul truck or other vehicle.

FIG. 3 is a schematic diagram that illustrates an embodiment of the disclosure configured for installation in a vehicle such as a diesel powered long-haul truck that is equipped with a sleeper cab. Components of the electrical power system are shown within dashed outline 15.

A battery 10 is employed to power the vehicle hotel loads (e.g., refrigerator, microwave, toaster, coffee maker, television system, lap top computer, fan, hair dryer, and/or interior lighting) that may require electrical energy when the vehicle is parked and shut off. Again, the battery 10 is shown as a single battery for simplicity, but may comprise any number of batteries, preferably 2-8 batteries, and most preferably either 1 or 2 arrays of 4 batteries each 10a, 10b. The battery 10 may comprise a positive pole 32 and a negative, or ground pole 34. Various commercially-available batteries, including lead, acid-type batteries, absorbent glass mat (AGM) type batteries, and other batteries capable of deep-cycling for supplying power to hotel loads may be used.

Figure 4:
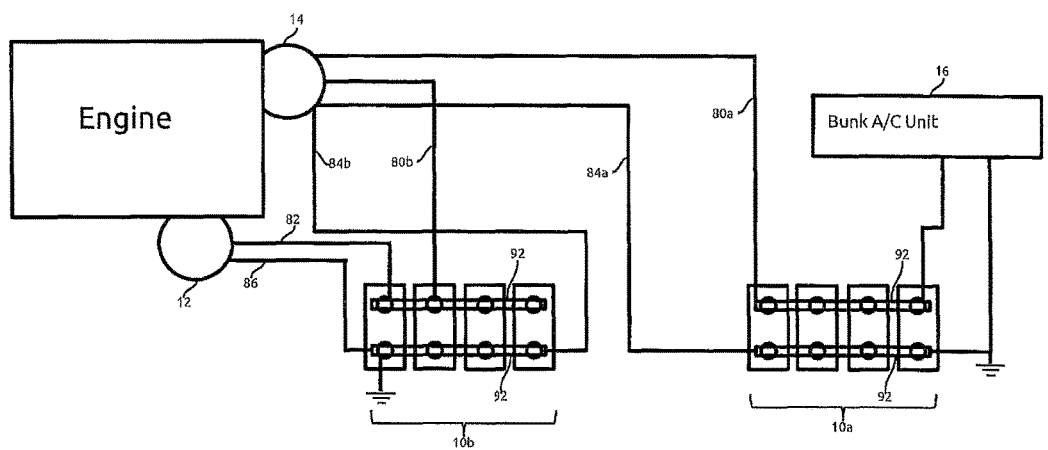
FIG. 4 is a schematic diagram for an embodiment which includes an 8-battery system for supplying power to a vehicle air conditioning system.

Battery 10 may be charged by a 240-430 amp truck alternator 14 while the truck is running, preferably 300-430 amp truck alternator 14. In the arrangement shown in FIG. 3, the field winding of alternator 14 is electrically connected internally a voltage regulator of alternator 14, which is connected to the positive alternator wire 80, and grounded negative wire 84 is routed directly to the battery 10. In one embodiment, the routing of the positive 80 and the negative 84 cables direct connection from the alternator 14 directly to the battery 10 without breaks or connections in the routing allows the voltage to travel through the cables with less restriction which results in the voltage drop between the alternator 14 and the battery 10 to be lower on both the positive 80 and the negative 84 wires. In another embodiment, there are tee clamps (not shown) installed on the positive and the negative cables 80,84. In another embodiment, a brass bar 92 (as shown in FIG. 4) connects the battery arrays and the positive wire 80 and negative wire 84 connect to the brass bars. The bars 92 allow the resistance of the circuit at the batteries to be at or below internal battery resistance allowing the current to flow into the batteries much quicker. In both embodiments, this allows the charging amp hours to flow at a faster rate which allows the batteries 10 to be charged substantially fully relatively quickly and stay at a 95%-100% state of charge. The wires 80, 84 may be sized between 4/0 and double 4/0. This charging electrical loop creates lower voltage drop between truck alternator 14 and battery 10, which in turn charges the battery 10 at a faster rate, and keeps the battery 10 at a 95%-100% state of charge when the engine is on. Today's truck engine typically idles at about 600 RPM, with prior art the batteries 10 are charging at lower amps and taking more time to charge due to the voltage drop which typically causes resistance in the electrical current flow which can result in typically slower charging rate, and lower state of charge. In one embodiment of the disclosure, the positive 80 and ground 84 cables, and the alternator 14 is capable of 205 amps at idle.

Located outside dashed outline 15 of FIG. 3 is the engine off sensor 24. Also shown outside dashed outline 15 are electrically powered hotel loads 18 of the type involved with practicing the embodiment of the disclosure. Examples of such hotel loads 18 shown in FIG. 3 include a microwave oven, a refrigerator, a toaster, a coffee maker, television system, lap top computer, fan, and hair dryer. Also indicated in FIG. 3 is a control panel 26 that includes controls and a power monitor that provides status information relating to the power system and other components shown in FIG. 3. For example, power monitor of control panel 26 provides information such as battery voltage and the amount of time the power system will continue to supply power at the current battery drain rate. Additional components that are located outside dashed outline 15 in the arrangement of FIG. 3 include interior lighting 30 for the vehicle, as well as the truck electrical system 28.

Also located within dashed outline 15 is a power inverter 22 and a low voltage disconnect (LVD) 20 which are interconnected for providing DC to AC power to the vehicle hotel loads 18 and other vehicle components that may be in operation when the vehicle is parked and the engine is in its stopped or non-running state. As is known in the art, a low voltage disconnect 20 is often used to disconnect vehicle batteries 10 from the auxiliary loads such as hotel loads 18 when battery terminal voltage reaches a predetermined disconnect voltage to thereby eliminate battery drain. In the arrangement of FIG. 3, low voltage disconnect 20 is electrically connected to engine-off sensor 24. In this arrangement, engine-off sensor 24 provides a voltage that is at or near ground potential (0 volts) when engine is running to complete an electrical path that includes low voltage disconnect 20 and prevents low voltage disconnect 20 from shutting down (disconnecting) battery 10 while vehicle is in operation. The inverter 22 may have receiving outlets capable of receiving standard electrical plugs, like 2-prong or 3-prong plugs typically found in North American electrical components.

It will be recognized by those skilled in the art that a low voltage disconnect unit is typically connected to vehicle ignition power to obtain a signal indicating that the vehicle engine is running. However, other sensor arrangements can be employed.

As is known to those skilled in the art, the disconnect voltage of a low voltage disconnect typically is set by the manufacturer to a voltage that is specified by purchasers. As also is known to those skilled in the art, currently available low voltage disconnects provide electrical and/or audible warning signals prior to disconnecting the batteries. In the currently an embodiment of the disclosure, the low voltage disconnect 20, is set at the manufacture, the inverter 22 has a low voltage disconnect built in and has been set at 11.8 volts.

FIG. 4 shows a schematic diagram of an embodiment with two sets of 4-battery arrays 10a and 10b. As shown, the starter 12 and the alternator 14 are operably connected to the engine. The starter 12 has a positive wire 82 and a negative or ground wire 86 directly connected to the front battery array 10b. The alternator has two positive wires 80a and 80b, and two negative or ground wires 84a and 84b directly connected to the battery arrays, 10a and 10b respectively. When the engine is stopped, the rear battery array 10a may supply the energy to run bunk air conditioning unit 16.

Figure 5B:
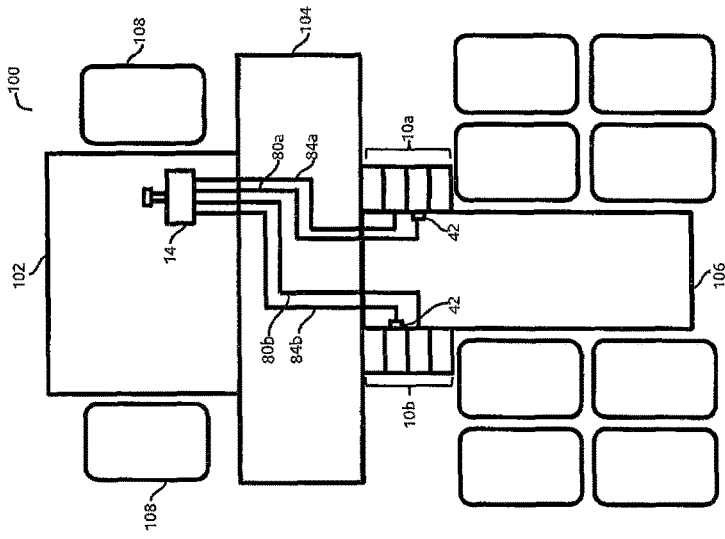
FIG. 5B is a diagram showing another embodiment of the locations on a typical long-haul truck for the arrays of batteries.
Figure 5A:
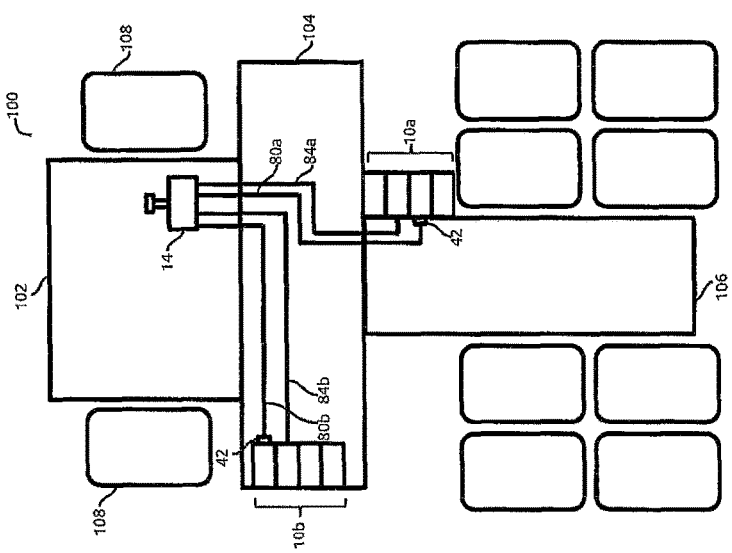
FIG. 5A is a diagram showing an embodiment of the locations on a typical long-haul truck for the arrays of batteries.

FIGS. 5A and 5B show two embodiments showing the locations on a typical long-haul truck for the battery arrays 10a and 10b. The figures show a simplified diagram of a typical truck 100, with a frame 106, an engine compartment 102 and a cab 104 that disposed on the frame, and tires 108. The alternator 14 is shown in the engine compartment, and as shown in FIGS. 1-4, is operably connected to the engine located in the engine compartment 102.

In each of these embodiments, a 200 Amp fuse is electrically connected to the positive cables 80a and 80b at the battery arrays 10a and 10b. As shown in FIG. 5A, the front battery array 10b is under the cab on the driver's side of the truck, and the rear battery array 10b is disposed on the frame behind the cab. Using this configuration, the alternator cables 80b and 84b may be about 12' each, and the alternator cables 80a and 84a may be about 16' each. As shown in FIG. 5B, both the battery arrays 10a and 10b are disposed on the frame behind the cab. Using this configuration, the alternator cables 80b and 84b may be about 19' each, and the alternator cables 80a and 84a may be about 16' each. In each embodiment shown, the wires or cables 80a, 80b, 84a, and 84b are about 4/0 AWG wires or greater in size.

The various embodiments have been tested with a Modac 2014 CR9000X Campbell Scientific data logger that records data every five seconds, monitoring the following.

1) Alternator output current
2) Charge/discharge current at the batteries
3) Inverter current
4) Alternator voltage
5) Battery voltage
6) Ambient air temperature
7) Alternator inlet air temperature
8) Battery box temperature
9) Alternator speed, at the 40SI r-terminal, converted to Engine RPM Using the above cited test method and running various hotel loads, it is estimated that any given truck will save about 90 minutes of run time per day, or about 32,850 minutes (547½ hours) per year if run every day. Over a ten-year span, that means a given truck will save about 5,475 hours of run time. Estimating about 1 gallon of diesel per hour of idle run time, 5,475 gallons at about $4.00 per gallon equals about $21,900 savings per vehicle in a ten-year span. Given a standard fleet of 6,000 trucks, that equals about a $131,400,000 savings per fleet per ten years.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A system for powering a hotel load in a vehicle, comprising:
    a power supply comprising a positive pole and a negative pole;
    an alternator operably connected to the engine and in direct electrical communication with the positive pole and the negative pole through a pair of alternator cables;
    a starter operably connected to the engine and in direct electrical communication with the positive pole and the negative pole through at least one starter cable;
    a power inverter in electrical communication with the positive pole and the negative pole through a pair of power inverter cables;
    wherein the alternator, the starter, and the power inverter are connected in parallel to the power supply.

2. The system of claim 1 further comprising an engine, wherein the alternator and the starter are operably connected to the engine.

3. The system of claim 2, wherein the engine comprises a running state and a non-running state, and wherein the alternator is configured to charge the power supply when the engine is in a running state.

4. The system of claim 1, wherein the alternator cables and the at least one starter cable are between about 4/0 AWG and double 4/0 AWG.

5. The system of claim 4, wherein the alternator cables and the at least one starter cable are about 4/0 AWG.

6. The system of claim 1, wherein the alternator is rated between about 300 Amp and about 430 Amp.

7. The system of claim 6, wherein the alternator is an about 300 Amp alternator.

8. The system of claim 1, wherein the power supply comprises a plurality of batteries electrically connected in parallel.

9. The system of claim 1, wherein the power supply comprises 2 arrays each having 4 batteries, the batteries in each array being electrically connected in parallel.

10. The system of claim 1, further comprising a Low Voltage Disconnect electrically connected in series between the power supply and the power inverter.

11. A vehicle capable of providing hotel power for an extended period of time, the vehicle comprising:
    a vehicle frame;
    a vehicle engine coupled with the frame and having a running state and a stopped state;
    a plurality of batteries electrically connected in parallel;
    an alternator and a starter each operably coupled with the vehicle engine, and each directly electrically connected to the plurality of batteries via battery cables;
    a power inverter electrically connected to the plurality of batteries;
    a hotel power load in electrical communication with the power inverter;
    wherein the alternator is configured to provide electrical power to the plurality of batteries when the vehicle engine is in the running state, and the plurality of batteries is configured to provide electrical power to the hotel power load when the vehicle engine is in the stopped state.

12. The vehicle of claim 11, wherein the battery cables are between about 4/0 AWG and double 4/0 AWG.

13. The vehicle of claim 12, wherein the battery cables are 4/0 AWG.

14. The vehicle of claim 11, wherein the alternator is between 300 Amp and 430 Amp.

15. The vehicle of claim 14, wherein the alternator is a 300 Amp alternator.

16. The vehicle of claim 11, further comprising a Low Voltage Disconnect electrically between the inverter and the plurality of batteries.

17. The vehicle of claim 11, wherein the plurality of batteries comprises 4 batteries.

18. A method of recharging a power supply in a vehicle comprising the steps of:
    providing a vehicle with a frame, an engine coupled with the frame and capable of propulsion, an alternator operably coupled with the engine, an alternator and a starter operably coupled with the engine, and a power supply disposed on the frame, wherein the alternator, starter, and power supply each comprise an electrically positive pole and an electrically negative pole;
    connecting the positive pole of the power supply directly to the positive pole of the alternator and connecting the negative pole of the power supply directly to the negative pole of the alternator;
    connecting the positive pole of the power supply directly to the positive pole of the starter and connecting the negative pole of the power supply directly to the negative pole of the starter;
    generating electrical power in the alternator by running the engine for a time;
    impressing on the power supply the electrical power generated in the alternator in the generating step;
    charging the power supply substantially close to a full power capacity of the power supply.

19. The method of claim 18, wherein when the power supply is in a substantially depleted state, the time to run the engine in the generating step is less than about 20 minutes.

20. The method of claim 18, further comprising the steps of:
    providing a Low Voltage Disconnect and an inverter electrically connected to the power supply in series;
    connecting a hotel load via standard electrical plugs to the inverter;
    sensing the power remaining in the power supply;
    disconnecting the hotel load from the power supply when the power remaining in the power supply drops below a predetermined value.

21. The system of claim 1, wherein the power supply comprises at least 2 arrays each having multiple batteries, the batteries in each array being electrically connected to each other in parallel.

22. The system of claim 21 wherein each array of batteries is in direct electrical communication with the alternator.

23. The system of claim 8 further comprising a first brass bar connecting the positive pole of each of the plurality of batteries and a second brass bar connecting the negative pole of each of the plurality of batteries.

* * * * *